May 10, 1949.   K. E. STOBER   2,469,999
MIXING HEAD FOR EXTRUSION MACHINES
Filed May 30, 1945

INVENTOR.
Kenneth E. Stober
BY
Griswold & Burdick
ATTORNEYS

Patented May 10, 1949

2,469,999

UNITED STATES PATENT OFFICE 2,469,999

MIXING HEAD FOR EXTRUSION MACHINES

Kenneth E. Stober, Midland, Mich., assignor to The Dow Chemical Company, Midland, Mich., a corporation of Delaware Application May 30, 1945, Serial No. 596,626

7 Claims. (Cl. 18—12)

This invention relates to a mixing head for extrusion machines.

Extrusion machines for the fabrication of shaped articles from thermoplastic resins are ordinarily used solely for forcing the heated resin through a shaping die. Any mixing operation, such as blending the plastic with coloring materials or plasticizers, is customarily carried out in separate equipment, from which the mixed plastic must then be transferred to the extruder. This two-step procedure, which has been occasioned by the poor mixing characteristics of conventional extruders, requires a considerable investment in expensive machinery and necessitates extra labor. In addition, with heat-sensitive resins, the separation of the stages of mixing and of extrusion may require the resin to remain heated for so long a period that appreciable degradation and oxidative discoloration occur.

With these factors in mind, it is the principal object of the present invention to provide mixing equipment which may be incorporated as a part in conventional extruders, rendering them capable of rapid, thorough mixing as well as extrusion.

In extruders according to the invention, a mixing head is placed in the line of plastic flow between the screw or other feeding device and the extrusion orifice. This head comprises a chamber in which a number of rotatable transverse plates are interleaved with stationary plates, forming, in operation, a labyrinth with moving walls through which the material being extruded must pass, and in which it becomes thoroughly mixed.

Figure 1:
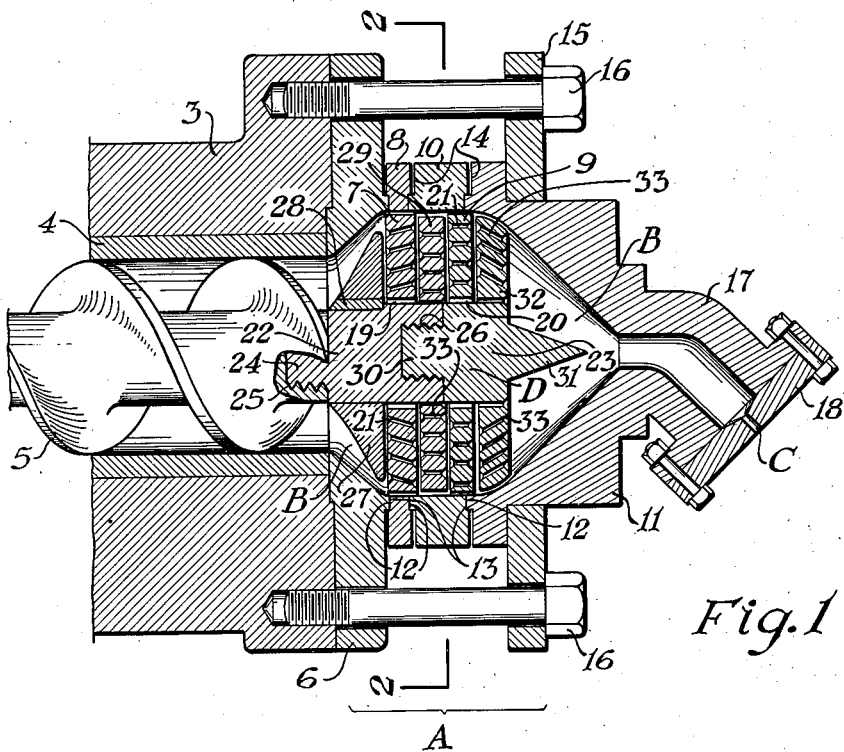
Figure 2:
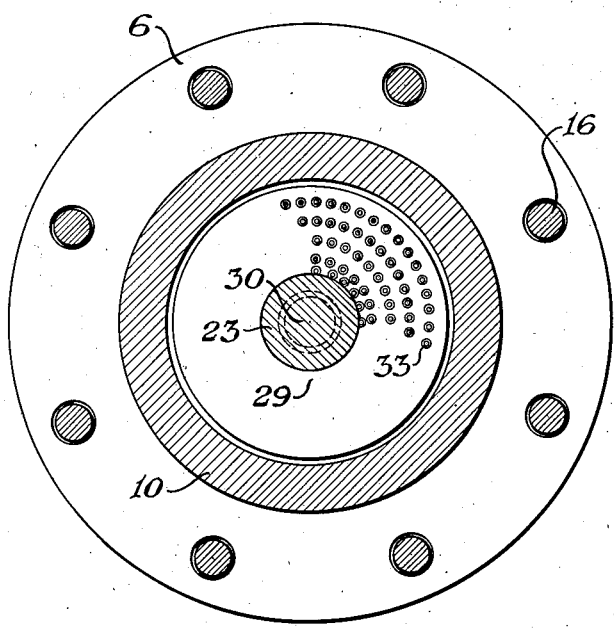

The mixing head of the invention, in a preferred form, is illustrated in the accompanying drawings, in which Fig. 1 is a vertical section through the head, showing the assembly of parts, and Fig. 2 is a vertical section taken along the line 2—2 of Fig. 1.

In the machine of Figs. 1 and 2, the mixing head A is mounted coaxially on the outlet end of a screw extruder, the casing 3 of which encloses a barrel 4 in which a feed screw 5 is fitted. The barrel is filled from a hopper (not shown) and the screw is turned by a gear drive (not illustrated) in conventional manner. Plastic material being extruded is forced by the screw 5 into a chamber B of circular cross-section formed in the head A and within which the mixing plates are situated, and thence through an extrusion orifice C where it is shaped to final form.

The stationary portion of the head A is, for convenience in assembling, constructed of four annular parts, a flanged adapter 6, a mixing disk 7 integral with its flange 8, a second mixing disk 9 provided with an integral flanged rim 10 somewhat more than twice as thick as the disk, and a flanged outlet block 11. These parts are maintained in alignment by inter-fitting rings 12 and grooves 13 formed in their respective flanges, the outer portions of the flanges being relieved, as at 14, to permit inserting gaskets (not shown). The assembly is held together by a clamp ring 15 secured in place by capscrews 16 threaded into the casing 3.

As is seen from Fig. 1, the central opening in the adapter 6 at its inlet face is of the same diameter as the barrel 4 and tapers out abruptly to form the chamber B of considerably enlarged diameter. The outlet block 11 has a reverse taper, and necks down from full chamber diameter to a small opening leading into an integrally formed nozzle 17, on the end of which is bolted a die 18 defining the extrusion orifice C.

The stationary mixing disks 7 and 9 have central openings 19 and 20, the diameters of which are small in comparison to that of the full chamber. These disks, then, constitute baffles extending inwardly from the wall of the chamber B to provide restricted openings through which plastic material is forced by the screw 5. Both of the disks 7 and 9 are perforated by a multiplicity of holes 21, the diameters of which are small fractions of the thickness of a disk. These holes are preferably counter-sunk at both faces of the disk.

The rotor D of the mixing head (Fig. 1) is formed of two short shafts 22 and 23, which together constitute a spindle extending axially from the end of the feedscrew 5 into the chamber B and on which the mixing elements are mounted. The rear shaft 22 is formed at one end with a threaded boss 24 which screws into a corresponding socket 25 in the feedscrew 5, and at the other end has an axial threaded socket 26. A frusto-conical annular deflector plate 27 having an outer diameter slightly less than that of the chamber B slips over the rear portion of the shaft 22 and is secured by a key 28. The forward portion of the shaft 22 has integrally formed therewith a mixing disk 29 which extends transversely into the space between the stationary disks 7 and 9.

The forward shaft 23 of the rotor also carries at one end a threaded boss 30 which screws into the socket 26 on the rear shaft, and at the other end a smooth-surfaced torpedo 31 which projects toward the nozzle 17. This shaft likewise is formed integrally with a mixing disk 32 which extends transversely from the shaft toward the wall of the chamber B.

Both of the rotatable disks 29 and 32 are multiply-perforated with small holes 33 having counter-sunk openings, these holes being preferably spaced in their respective disks so as to avoid registering with the holes 21 in the adjacent stationary disks 7 and 9 at any rotational position of the rotor D.

In the mixing head, the outside diameters and the thicknesses of the stationary and the rotatable disks, and the diameters of the annular openings 19 and 20, are preferably chosen so that the clearances between the edges of the rotating disks and the walls of the chamber B, between the adjacent rotating and stationary disks, and between the stationary disks and the spindle, are all only fractions of the thickness of a disk. All parts should be carefully polished and in so far as possible, designed to provide streamline flow at all places in the mixing head.

If desired, external heating jackets or electric heating elements may be placed around the casing 3, the mixing head A, and the extrusion nozzle 17 to provide means for controlling the temperature of material passing through the apparatus.

In a typical machine according to the invention, the diameter of the extrusion barrel is eight inches and that of the mixing chamber is twelve inches. All disks are one inch thick, and are perforated by 140 to 160 one-eighth inch holes. Clearances between moving and stationary parts are all about one-fourth inch.

In operating the machine of Figs. 1 and 2, the feed screw 5 is set in motion and the thermoplastic resin and the material to be mixed therewith are introduced at constant rates into the inlet of the screw. The two materials are then urged forward by the screw, passing through the barrel 4 and into the chamber B. There they flow over the face of the deflector 27 and enter the space between the latter and the first stationary disk 7. A large part of the material then flows in a tortuous path through the spaces constituting the clearances between the stationary disks 7 and 9, and the shafts 22 and 23 and the rotating plates 29 and 32, and thence into the outlet block 11 and through the orifice C. During traverse of this path, the plastic and other material are subjected to repeated wiping or rolling action between the stationary and moving parts, and are thoroughly mixed. At the same time, as a result of the pressure developed by the screw 5, a smaller part of the material flows through the holes in the various disks, being thus repeatedly broken up into small streams which are intermingled again and again with one another and with the larger mass of material flowing through the clearances. Excellent mixing is thus achieved and a uniformly blended material issues from the orifice C.

The holes in the stationary disks, in addition to subdividing the flowing material so that it may be mixed more readily, perform the additional function of helping to average, over a period of time, the composition of the mass being mixed. Thus, the diameter of the holes being small, the rate of flow of plastic material through the holes is considerably slower than is the flow through the clearances around the disks. In consequence, the material entering the holes is slowed up, and, on issuing from the holes, becomes mixed with later-introduced material flowing through the clearances. In this way, minor variations in the proportional composition of material being delivered by the feedscrew are averaged out, so that an exceptionally uniform product is obtained.

While the mixing head as shown in Figs. 1 and 2 represents a preferred construction, a number of alternative constructions are possible without departing from the invention. For example, the spindle D may be made in one piece, with the rotating disks keyed to it. Likewise, other means of mounting the stationary disks transversely to the wall of the chamber B may be selected. The number of stationary and rotatable disks may be increased. The holes in the disks may, though less advantageously, be omitted from one or all of the disks. Impelling blades may be formed on the faces of the rotating disks. Likewise, feeding means other than a feedscrew may be used for conveying the plastic material into the mixing head, in which case the rotor D must have bearings to support the shaft and means for rotating the latter. Still other obvious variations are possible within the scope of the following claims.

What is claimed is:

1. In an extruder, in combination with an extrusion orifice and a feeder for forcing plastic material through the orifice: a mixing head having therein a chamber of circular cross-section constituting a passage between the feeder and the orifice; a spindle extending axially in the chamber and having a diameter small in comparison to that of the chamber and means for rotating the spindle; a plurality of multiply-perforated disks mounted on the spindle at spaced intervals not greatly exceeding the thickness of a disk, each disk being of such diameter that the clearance between the edge thereof and the wall of the chamber is only a fraction of the thickness of the disk; and a plurality of spaced multiply-perforated stationary annular disks mounted transversely in the chamber and extending from the wall thereof into the spaces between the rotatable disks, the thickness of each annular disk and the internal diameter of its annulus being such that the clearances between the disk and the adjacent rotating disks and spindle are only fractions of the thickness of the disk.

2. A machine according to claim 1 wherein the diameters of the perforations in the rotatable and stationary disks are small fractions of the thickness of such disks.

3. A machine according to claim 1 wherein the holes constituting the perforations in the rotatable and stationary disks are counter-sunk at both faces of the disks.

4. A machine according to claim 1 wherein the perforations in the rotatable and the stationary disks are spaced in their respective disks so as to avoid registration of the perforations in adjacent disks at any rotational position of a rotatable disk.

5. A machine according to claim 1 wherein there is mounted on the spindle within the mixing head at a point between the feeder and the first perforated disk a frusto-conical annular deflector plate having a diameter slightly less than that of the mixing chamber.

6. In an extrusion machine, in combination with a casing having a barrel therein, a feedscrew in the barrel, and an extrusion orifice: a mixing head mounted at the outlet of the barrel coaxially therewith and having therein a chamber of circular cross-section constituting a passage between the barrel and the orifice, the diameter of the chamber being considerably greater than that of the barrel; a spindle mounted axially in the end of the feedscrew and extending into the chamber and having a diameter small in comparison to that of the chamber; a plurality of disks mounted on the spindle at spaced intervals not greatly exceeding the thickness of a disk, each disk being of such diameter that the clearance between the edge thereof and the wall of the chamber is only a fraction of the thickness of the disk, and each disk being multiply-perforated with holes having diameters which are small fractions of the thickness of the disk; and a plurality of spaced stationary annular disks mounted transversely in the chamber and extending from the wall thereof into the spaces between the rotatable disks, the thickness of each annular disk and the internal diameter of its annulus being such that the clearances between the disk and the adjacent rotating disks and spindle are only fractions of the thickness of the disk, each disk being multiply-perforated with holes having diameters which are small fractions of the thickness of the disk, such holes being spaced in their respective disks so as to avoid registration with the holes in adjacent disks at any rotational position of a rotatable disk.

7. The method of simultaneously coloring and extruding a thermoplastic resin which comprises: continuously introducing the thermoplastic and a coloring material therefor into a forwarding and initial mixing zone; thereafter in a second zone subdividing the flowing mass into a major stream and a plurality of minor streams, subjecting the major stream to intense mixing action while retarding the flow of the minor streams relative to that of the major stream, and re-mixing the delayed minor streams into the major stream, such subdivision and remixing being carried out repeatedly; and thereafter extruding the resulting colored stream from an orifice.

KENNETH E. STOBER.

REFERENCES CITED

The following references are of record in the file of this patent:

UNITED STATES PATENTS

| Number | Name | Date |
|---|---|---|
| 1,028,131 | O'Brien | June 4, 1912 |
| 1,320,718 | Steinle | Nov. 4, 1919 |
| 1,375,623 | Bartels | Apr. 19, 1921 |
| 2,039,162 | Gerstenburg | Apr. 28, 1936 |
| 2,092,992 | Thalman | Sept. 14, 1937 |
| 2,242,364 | Montanair | May 20, 1941 |